US009789541B2

(12) United States Patent
Fager

(10) Patent No.: US 9,789,541 B2
(45) Date of Patent: Oct. 17, 2017

(54) METHOD FOR ADDITIVE MANUFACTURING OF THREE-DIMENSIONAL ARTICLES

(71) Applicant: Arcam AB, Moelndal (SE)

(72) Inventor: Mattias Fager, Goeteborg (SE)

(73) Assignee: Arcam AB, Moelndal (SE)

( * ) Notice: Subject to any disclaimer, the term of this patent is extended or adjusted under 35 U.S.C. 154(b) by 356 days.

(21) Appl. No.: 14/621,209

(22) Filed: Feb. 12, 2015

(65) Prior Publication Data

US 2015/0251249 A1 Sep. 10, 2015

Related U.S. Application Data

(60) Provisional application No. 61/949,585, filed on Mar. 7, 2014.

(51) Int. Cl.
*B33Y 80/00* (2015.01)
*B28B 1/00* (2006.01)
(Continued)

(52) U.S. Cl.
CPC ............ *B22F 3/1055* (2013.01); *B28B 1/001* (2013.01); *B29C 67/0077* (2013.01);
(Continued)

(58) Field of Classification Search
CPC ........... B22F 3/1055; B22F 2003/1057; B29C 67/007; B29C 67/0051; H01J 37/30; H01J 37/305; B33Y 80/00; B33Y 10/00
See application file for complete search history.

(56) References Cited

U.S. PATENT DOCUMENTS 2,264,968 A 12/1941 De Forest
2,323,715 A 7/1943 Kuehni
(Continued)

FOREIGN PATENT DOCUMENTS

CA 2860188 A1 6/2006
CN 101607311 A 12/2009
(Continued)

OTHER PUBLICATIONS

Cheah, Chi-Mun, et al., "Automatic Algorithm for Generating Complex Polyhedral Scaffold Structure for Tissue Enginering", Tissue Engineering, 2004, pp. 595-610, vol. 10, No. 3/4, XP002691483.
(Continued)

*Primary Examiner* — Colleen Dunn
*Assistant Examiner* — Rajinder Bajwa
(74) *Attorney, Agent, or Firm* — Alston & Bird LLP

(57) ABSTRACT

A method for forming at least one three-dimensional article through successive fusion of parts of a powder bed, which parts correspond to successive cross sections of the three-dimensional article, the method comprising the steps of: providing a model of the at least one three-dimensional article; applying a first powder layer on a work table; directing a first energy beam from a first energy beam source over the work table causing the first powder layer to fuse in first selected locations according to corresponding models to form a first cross section of the three-dimensional article, where the first energy beam is fusing at least a first region of a first cross section with parallel scan lines in a first direction; varying a distance between two adjacent scan lines, which are used for fusing the powder layer, as a function of a mean length of the two adjacent scan lines.

17 Claims, 9 Drawing Sheets

(51) Int. Cl.
*B22F 3/105* (2006.01)
*B29C 67/00* (2017.01)
*B29K 105/00* (2006.01)
*B33Y 10/00* (2015.01)
*B33Y 30/00* (2015.01)
*B33Y 50/02* (2015.01)

(52) U.S. Cl.
CPC .. *B29C 67/0088* (2013.01); *B22F 2003/1057* (2013.01); *B29K 2105/251* (2013.01); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 3,634,644 A | 1/1972 | Ogden et al. |
| 3,838,496 A | 10/1974 | Kelly |
| 3,882,477 A | 5/1975 | Mueller |
| 4,314,134 A | 2/1982 | Schumacher et al. |
| 4,348,576 A | 9/1982 | Anderl et al. |
| 4,352,565 A | 10/1982 | Rowe et al. |
| 4,401,719 A | 8/1983 | Kobayashi et al. |
| 4,541,055 A | 9/1985 | Wolfe et al. |
| 4,818,562 A | 4/1989 | Arcella et al. |
| 4,863,538 A | 9/1989 | Deckard |
| 4,888,490 A | 12/1989 | Bass et al. |
| 4,927,992 A | 5/1990 | Whitlow et al. |
| 4,958,431 A | 9/1990 | Clark et al. |
| 4,988,844 A | 1/1991 | Dietrich et al. |
| 5,118,192 A | 6/1992 | Chen et al. |
| 5,135,695 A | 8/1992 | Marcus |
| 5,167,989 A | 12/1992 | Dudek et al. |
| 5,182,170 A | 1/1993 | Marcus et al. |
| 5,204,055 A | 4/1993 | Sachs et al. |
| 5,247,560 A | 9/1993 | Hosokawa et al. |
| 5,393,482 A | 2/1995 | Benda et al. |
| 5,483,036 A | 1/1996 | Giedt et al. |
| 5,511,103 A | 4/1996 | Hasegawa |
| 5,595,670 A | 1/1997 | Mombo Caristan |
| 5,647,931 A | 7/1997 | Retallick et al. |
| 5,753,274 A | 5/1998 | Wilkening et al. |
| 5,837,960 A | 11/1998 | Lewis et al. |
| 5,876,550 A | 3/1999 | Feygin et al. |
| 5,904,890 A | 5/1999 | Lohner et al. |
| 5,932,290 A | 8/1999 | Lombardi et al. |
| 6,046,426 A | 4/2000 | Jeantette et al. |
| 6,162,378 A | 12/2000 | Bedal et al. |
| 6,419,203 B1 | 7/2002 | Dang |
| 6,537,052 B1 | 3/2003 | Adler |
| 6,554,600 B1 | 4/2003 | Hofmann et al. |
| 6,583,379 B1 | 6/2003 | Meiners et al. |
| 6,676,892 B2 | 1/2004 | Das et al. |
| 6,724,001 B1 | 4/2004 | Pinckney et al. |
| 6,746,506 B2 | 6/2004 | Liu et al. |
| 6,751,516 B1 | 6/2004 | Richardson |
| 6,764,636 B1 | 7/2004 | Allanic et al. |
| 6,811,744 B2 | 11/2004 | Keicher et al. |
| 6,815,636 B2 | 11/2004 | Chung et al. |
| 6,824,714 B1 | 11/2004 | Türck et al. |
| 7,003,864 B2 | 2/2006 | Dirscherl |
| 7,020,539 B1 | 3/2006 | Kovacevic et al. |
| 7,165,498 B2 | 1/2007 | Mackrill et al. |
| 7,204,684 B2 | 4/2007 | Ederer et al. |
| 7,291,002 B2 | 11/2007 | Russell et al. |
| 7,452,500 B2 | 11/2008 | Uckelmann |
| 7,537,722 B2 | 5/2009 | Andersson et al. |
| 7,540,738 B2 | 6/2009 | Larsson et al. |
| 7,635,825 B2 | 12/2009 | Larsson |
| 7,686,605 B2 | 3/2010 | Perret et al. |
| 7,696,501 B2 | 4/2010 | Jones |
| 7,713,454 B2 | 5/2010 | Larsson |
| 7,754,135 B2 | 7/2010 | Abe et al. |
| 7,799,253 B2 | 9/2010 | Höchsmann et al. |
| 7,871,551 B2 | 1/2011 | Wallgren et al. |
| 8,021,138 B2 | 9/2011 | Green |
| 8,083,513 B2 | 12/2011 | Montero-Escuder et al. |
| 8,187,521 B2 | 5/2012 | Larsson et al. |
| 8,308,466 B2 | 11/2012 | Ackelid et al. |
| 8,992,816 B2 | 3/2015 | Jonasson et al. |
| 9,073,265 B2 | 7/2015 | Snis |
| 9,079,248 B2 | 7/2015 | Ackelid |
| 9,126,167 B2 | 9/2015 | Ljungblad |
| 9,310,188 B2 | 4/2016 | Snis |
| 9,505,172 B2 | 11/2016 | Ljungblad |
| 9,550,207 B2 | 1/2017 | Ackelid |
| 2002/0104973 A1 | 8/2002 | Kerekes |
| 2002/0152002 A1 | 10/2002 | Lindemann et al. |
| 2002/0195747 A1 | 12/2002 | Hull et al. |
| 2003/0043360 A1 | 3/2003 | Farnworth |
| 2003/0133822 A1 | 7/2003 | Harryson |
| 2003/0205851 A1 | 11/2003 | Laschutza et al. |
| 2004/0012124 A1 | 1/2004 | Li et al. |
| 2004/0026807 A1 | 2/2004 | Andersson et al. |
| 2004/0084814 A1 | 5/2004 | Boyd et al. |
| 2004/0104499 A1 | 6/2004 | Keller |
| 2004/0148048 A1 | 7/2004 | Farnworth |
| 2004/0173496 A1 | 9/2004 | Srinivasan |
| 2004/0173946 A1 | 9/2004 | Pfeifer et al. |
| 2004/0204765 A1 | 10/2004 | Fenning et al. |
| 2004/0217095 A1 | 11/2004 | Herzog |
| 2005/0173380 A1 | 8/2005 | Carbone |
| 2005/0186538 A1* | 8/2005 | Uckelmann ........ A61C 13/0004 433/201.1 |
| 2006/0108712 A1 | 5/2006 | Mattes |
| 2006/0145381 A1 | 7/2006 | Larsson |
| 2006/0147332 A1 | 7/2006 | Jones et al. |
| 2006/0157892 A1 | 7/2006 | Larsson |
| 2006/0180957 A1 | 8/2006 | Hopkinson et al. |
| 2006/0284088 A1 | 12/2006 | Fukunaga et al. |
| 2007/0074659 A1 | 4/2007 | Wahlstrom |
| 2007/0175875 A1 | 8/2007 | Uckelmann et al. |
| 2007/0179655 A1 | 8/2007 | Farnworth |
| 2007/0182289 A1 | 8/2007 | Kigawa et al. |
| 2007/0298182 A1 | 12/2007 | Perret et al. |
| 2008/0236738 A1 | 10/2008 | Lo et al. |
| 2009/0017219 A1 | 1/2009 | Paasche et al. |
| 2009/0152771 A1 | 6/2009 | Philippi et al. |
| 2009/0206056 A1 | 8/2009 | Xu et al. |
| 2010/0007062 A1* | 1/2010 | Larsson ................ B22F 3/1055 264/485 |
| 2010/0260410 A1 | 10/2010 | Taminger et al. |
| 2010/0310404 A1 | 12/2010 | Ackelid |
| 2010/0316856 A1 | 12/2010 | Currie et al. |
| 2011/0061591 A1 | 3/2011 | Stecker |
| 2011/0114839 A1 | 5/2011 | Stecker et al. |
| 2011/0133367 A1 | 6/2011 | Weidinger et al. |
| 2011/0240607 A1 | 10/2011 | Stecker et al. |
| 2011/0241575 A1 | 10/2011 | Caiafa et al. |
| 2011/0293770 A1 | 12/2011 | Ackelid et al. |
| 2011/0293771 A1 | 12/2011 | Oberhofer et al. |
| 2011/0309554 A1 | 12/2011 | Liska et al. |
| 2011/0316178 A1 | 12/2011 | Uckelmann |
| 2012/0100031 A1 | 4/2012 | Ljungblad |
| 2012/0164322 A1 | 6/2012 | Teulet |
| 2012/0183701 A1 | 7/2012 | Pilz et al. |
| 2012/0193530 A1 | 8/2012 | Parker et al. |
| 2012/0211155 A1 | 8/2012 | Wehning et al. |
| 2012/0223059 A1 | 9/2012 | Ljungblad |
| 2012/0225210 A1 | 9/2012 | Fruth |
| 2012/0237745 A1 | 9/2012 | Dierkes et al. |
| 2012/0266815 A1 | 10/2012 | Brunermer |
| 2013/0055568 A1 | 3/2013 | Dusel et al. |
| 2013/0162134 A1 | 6/2013 | Mattausch et al. |
| 2013/0186514 A1 | 7/2013 | Zhuang et al. |
| 2013/0216959 A1 | 8/2013 | Tanaka et al. |
| 2013/0233846 A1 | 9/2013 | Jakimov et al. |
| 2013/0264750 A1 | 10/2013 | Hofacker et al. |
| 2013/0270750 A1* | 10/2013 | Green ................ B29C 67/0077 264/497 |
| 2013/0300286 A1 | 11/2013 | Ljungblad et al. |
| 2013/0343947 A1 | 12/2013 | Satzger et al. |
| 2014/0175708 A1 | 6/2014 | Echigo et al. |
| 2014/0271964 A1 | 9/2014 | Roberts, IV et al. |

(56) References Cited

U.S. PATENT DOCUMENTS

| | | |
|---|---|---|
| 2014/0301884 A1 | 10/2014 | Hellestam et al. |
| 2014/0308153 A1 | 10/2014 | Ljungblad |
| 2014/0314609 A1 | 10/2014 | Ljungblad et al. |
| 2014/0314964 A1 | 10/2014 | Ackelid |
| 2014/0348691 A1 | 11/2014 | Ljungblad et al. |
| 2014/0363327 A1 | 12/2014 | Holcomb |
| 2014/0367367 A1 | 12/2014 | Wood et al. |
| 2015/0004045 A1 | 1/2015 | Ljungblad |
| 2015/0071809 A1 | 3/2015 | Nordkvist et al. |
| 2015/0086409 A1 | 3/2015 | Hellestam |
| 2015/0088295 A1 | 3/2015 | Hellestam |
| 2015/0139849 A1 | 5/2015 | Pialot, Jr. et al. |
| 2015/0151490 A1 | 6/2015 | Jonasson et al. |
| 2015/0165524 A1 | 6/2015 | Ljungblad et al. |
| 2015/0165525 A1 | 6/2015 | Jonasson |
| 2015/0174658 A1 | 6/2015 | Ljungblad |
| 2015/0174695 A1 | 6/2015 | Elfstroem et al. |
| 2015/0283610 A1 | 10/2015 | Ljungblad et al. |
| 2015/0283613 A1 | 10/2015 | Backlund et al. |
| 2015/0290710 A1 | 10/2015 | Ackelid |
| 2015/0306819 A1 | 10/2015 | Ljungblad |
| 2016/0052056 A1 | 2/2016 | Fager |
| 2016/0052079 A1 | 2/2016 | Ackelid |
| 2016/0054115 A1 | 2/2016 | Snis |
| 2016/0054121 A1 | 2/2016 | Snis |
| 2016/0054347 A1 | 2/2016 | Snis |
| 2016/0059314 A1 | 3/2016 | Ljungblad et al. |
| 2016/0129501 A1 | 5/2016 | Loewgren et al. |
| 2016/0167160 A1 | 6/2016 | Hellestam |
| 2016/0167303 A1 | 6/2016 | Petelet |
| 2016/0202042 A1 | 7/2016 | Snis |
| 2016/0202043 A1 | 7/2016 | Snis |
| 2016/0211116 A1 | 7/2016 | Lock |
| 2016/0279735 A1 | 9/2016 | Hellestam |
| 2016/0282848 A1 | 9/2016 | Hellestam |
| 2016/0303687 A1 | 10/2016 | Ljungblad |
| 2016/0307731 A1 | 10/2016 | Lock |
| 2016/0311021 A1 | 10/2016 | Elfstroem et al. |
| 2017/0080494 A1 | 3/2017 | Ackelid |
| 2017/0087661 A1 | 3/2017 | Backlund et al. |
| 2017/0106443 A1 | 4/2017 | Karlsson |
| 2017/0106570 A1 | 4/2017 | Karlsson |
| 2017/0136541 A1 | 5/2017 | Fager |
| 2017/0136542 A1 | 5/2017 | Nordkvist et al. |
| 2017/0173691 A1 | 6/2017 | Jonasson |
| 2017/0189964 A1 | 7/2017 | Backlund et al. |
| 2017/0227417 A1 | 8/2017 | Snis |
| 2017/0227418 A1 | 8/2017 | Snis |

FOREIGN PATENT DOCUMENTS

| | | |
|---|---|---|
| CN | 101635210 A | 1/2010 |
| CN | 201693176 U | 1/2011 |
| CN | 101607311 B | 9/2011 |
| CN | 203509463 U | 4/2014 |
| DE | 19952998 A1 | 5/2001 |
| DE | 20305843 U1 | 7/2003 |
| DE | 10235434 A1 | 2/2004 |
| DE | 102005014483 A1 | 10/2006 |
| DE | 202008005417 U1 | 8/2008 |
| DE | 102007018601 A1 | 10/2008 |
| DE | 102007029052 A1 | 1/2009 |
| DE | 102008012064 A1 | 9/2009 |
| DE | 102010041284 A1 | 3/2012 |
| DE | 102011105045 B3 | 6/2012 |
| DE | 102013210242 A1 | 12/2014 |
| EP | 0289116 A1 | 11/1988 |
| EP | 0322257 A2 | 6/1989 |
| EP | 0688262 A1 | 12/1995 |
| EP | 1358994 A1 | 11/2003 |
| EP | 1418013 A1 | 5/2004 |
| EP | 1466718 A2 | 10/2004 |
| EP | 1486318 A2 | 12/2004 |
| EP | 1669143 A1 | 6/2006 |
| EP | 1683593 A2 | 7/2006 |
| EP | 1721725 A1 | 11/2006 |
| EP | 1752240 A1 | 2/2007 |
| EP | 1952932 A2 | 8/2008 |
| EP | 2011631 A1 | 1/2009 |
| EP | 2119530 A1 | 11/2009 |
| EP | 2281677 A1 | 2/2011 |
| FR | 2980380 A1 | 3/2013 |
| JP | H05-171423 A | 7/1993 |
| JP | 2003241394 A | 8/2003 |
| JP | 2003245981 | 9/2003 |
| JP | 2009006509 A | 1/2009 |
| SE | 524467 C2 | 8/2004 |
| WO | WO 1993/08928 A1 | 5/1993 |
| WO | WO 1996/012607 A1 | 5/1996 |
| WO | WO 1997/37523 A2 | 10/1997 |
| WO | WO 2001/081031 A1 | 11/2001 |
| WO | WO 2001/85386 A2 | 11/2001 |
| WO | WO 2002/008653 A1 | 1/2002 |
| WO | WO 2004/007124 A1 | 1/2004 |
| WO | WO 2004/043680 A2 | 5/2004 |
| WO | WO 2004/054743 A1 | 7/2004 |
| WO | WO 2004/056511 A1 | 7/2004 |
| WO | WO 2004/106041 A2 | 12/2004 |
| WO | WO 2004/108398 A1 | 12/2004 |
| WO | WO 2006/091097 A2 | 8/2006 |
| WO | WO 2006/121374 A1 | 11/2006 |
| WO | WO 2007/112808 A1 | 10/2007 |
| WO | WO 2007/147221 A1 | 12/2007 |
| WO | WO 2008/013483 A1 | 1/2008 |
| WO | WO 2008/057844 A1 | 5/2008 |
| WO | WO 2008/074287 A1 | 6/2008 |
| WO | WO 2008/125497 A1 | 10/2008 |
| WO | WO 2008/147306 A1 | 12/2008 |
| WO | WO 2009/000360 A1 | 12/2008 |
| WO | WO 2009/072935 A1 | 6/2009 |
| WO | WO 2009/084991 A1 | 7/2009 |
| WO | WO 2010/095987 A1 | 8/2010 |
| WO | WO 2010/125371 A1 | 11/2010 |
| WO | WO 2011/008143 A1 | 1/2011 |
| WO | WO 2011/011818 A1 | 2/2011 |
| WO | WO 2011/030017 A1 | 3/2011 |
| WO | WO 2011/060312 A2 | 5/2011 |
| WO | WO 2012/102655 A1 | 8/2012 |
| WO | WO 2013/092997 A1 | 6/2013 |
| WO | WO 2013/098050 A1 | 7/2013 |
| WO | WO 2013/098135 A1 | 7/2013 |
| WO | WO 2013/159811 A1 | 10/2013 |
| WO | WO 2013/167194 A1 | 11/2013 |
| WO | WO 2013/178825 A2 | 12/2013 |
| WO | WO 2014/071968 A1 | 5/2014 |
| WO | WO 2014/092651 A1 | 6/2014 |
| WO | WO 2014/095200 A1 | 6/2014 |
| WO | WO 2014/095208 A1 | 6/2014 |
| WO | WO 2014/195068 A1 | 12/2014 |
| WO | WO 2015/032590 A2 | 3/2015 |
| WO | WO 2015/091813 A1 | 6/2015 |
| WO | WO 2015/142492 A1 | 9/2015 |

OTHER PUBLICATIONS

European Search Report dated Feb. 16, 2012, for corresponding Application No. EP07852089.7.

Guibas, Leonidas J., et al., "Randomized Incremental Construction of Delaunay and Voronoi Diagrams", Algorithmica, Jun. 1992, pp. 381-413, vol. 7, Issue 1-6, Springer-Verlag, New York.

International Preliminary Examining Authority (IPEA), Second Written Opinion for International Application No. PCT/EP2012/076025, dated Dec. 4, 2013, 4 pages European Patent Office, Germany.

International Preliminary Examining Authority, International Preliminary Report on Patentability for International Application No. PCT/EP2012/076025, including Applicant's Sep. 10, 2013 Response to the ISA's May 17, 2013 Written Opinion and Applicant's Jan. 14, 2014 Response to the IPEA's Second Written Opinion, dated Apr. 4, 2014, 15 pages, European Patent Office, Germany.

International Preliminary Examining Authority, International Preliminary Report on Patentability for International Application No.

(56) References Cited

OTHER PUBLICATIONS

PCT/EP2012/074383, including Applicant's Sep. 6, 2013 Reply to ISA's Feb. 27, 2013 Written Opinion, dated Jan. 20, 2014, 16 pages, European Patent Office, The Netherlands.
International Preliminary Report on Patentability, dated Nov. 27, 2009, of corresponding international application No. PCT/SE2007/001084.
International Search Report dated Apr. 9, 2010 for Application No. PCT/SE2009/050901.
International Search Report dated Sep. 17, 2008 for Application No. PCT/SE2008/000007.
International Search Report dated Sep. 2, 2008 of corresponding international application No. PCT/SE2007/001084.
International Searching Authority (ISA), International Search Report and Written Opinion for International Application No. PCT/EP2012/076025, dated May 17, 2013, 11 pages, European Patent Office, The Netherlands.
International Searching Authority, International Search Report and Written Opinion for International Application No. PCT/EP2012/074383, dated Feb. 27, 2013, 10 pages, European Patent Office, The Netherlands.
International Searching Authority, International Search Report for International Application No. PCT/SE2011/050093, dated Oct. 20, 2011, 5 pages, The Swedish Patent and Registration Office, Sweden.
Weigel, TH., et al., "Design and Preparation of Polymeric Scaffolds for Tissue Engineering," Expert Rev. Med. Devices, 2006, pp. 835-851, vol. 3, No. 6, XP002691485.
Yang, et al., "The Design off Scaffolfds for Use in Tissue Engineering, Part II, Rapid Prototyping Techniques", Tissue Engineering, 2002, pp. 1-11, vol. 8, No. 1, XP002691484.
International Searching Authority, International Search Report for International Application No. PCT/EP2012/057470, dated Jan. 24, 2013, 1 page, European Patent Office, The Netherlands.
International Searching Authority, International Search Report for International Application No. PCT/EP2012/058733, dated Mar. 5, 2013, 4 pages, European Patent Office, The Netherlands.
Gibson, D.W., et al., "Additive Manufacturing Technologies: Rapid Prototyping to Direct Digital Manufacturing", 2010, pp. 126-129, Springer, New York.
Motojima, Seiji, et al., "Chemical Vapor Growth of LaB6 Whiskers and Crystals Having a Sharp Tip", Journal of Crystal Growth, vol. 44, No. 1, Aug. 1, 1978 (Aug. 1, 1978), pp. 106-109.

\* cited by examiner

METHOD FOR ADDITIVE MANUFACTURING OF THREE-DIMENSIONAL ARTICLES

CROSS-REFERENCE TO RELATED APPLICATIONS

This application claims priority to and the benefit of U.S. Provisional Patent Application Ser. No. 61/949,585, filed Mar. 7, 2014, the content of which as is hereby incorporated by reference in its entirety.

BACKGROUND

Related Field

Various embodiments of the present invention relate to a method for additive manufacturing of three-dimensional articles.

Description of Related Art

Freeform fabrication or additive manufacturing is a method for forming three-dimensional articles through successive fusion of chosen parts of powder layers applied to a worktable. A method and apparatus according to this technique is disclosed in US 2009/0152771.

Such an apparatus may comprise a work table on which the three-dimensional article is to be formed, a powder dispenser, arranged to lay down a thin layer of powder on the work table for the formation of a powder bed, a ray gun for delivering energy to the powder whereby fusion of the powder takes place, elements for control of the ray given off by the ray gun over the powder bed for the formation of a cross section of the three-dimensional article through fusion of parts of the powder bed, and a controlling computer, in which information is stored concerning consecutive cross sections of the three-dimensional article. A three-dimensional article is formed through consecutive fusions of consecutively formed cross sections of powder layers, successively laid down by the powder dispenser. Further details regarding the controlling computer, which may be utilized in certain embodiments to in part or in whole implement the method described herein may be found in the detailed description provided herein.

There is a tendency when fusing a cross section of the three dimensional article with small dimensions, i.e., when using a shorter scan line length than a predetermined value, that material characteristics is worse compared to cross sections of the same three dimensional article with larger dimensions, i.e., when using a longer scan line length than the predetermined value. The degraded material characteristics for the small dimensions may be caused by porosities and/or incomplete fusion in the material.

BRIEF SUMMARY

An object of the various embodiments of the present invention is to provide a method which enables production of a three-dimensional article by freeform fabrication or additive manufacturing without introducing porosities and/or incomplete fusion when fusing small dimensions, i.e., using a shorter scan line length than a predetermined value.

The abovementioned article is achieved by the features in the method according to the broadest method-based claims provided herein.

In a first aspect of the invention it is provided a method for forming at least one three-dimensional article through successive fusion of parts of a powder bed, which parts correspond to successive cross sections of the three-dimensional article, the method comprising the steps of: providing a model of the at least one three-dimensional article; applying a first powder layer on a work table; directing a first energy beam from a first energy beam source over the work table causing the first powder layer to fuse in first selected locations according to corresponding models to form a first cross section of the three-dimensional article, where the first energy beam is fusing at least a first region of a first cross section with parallel scan lines in a first direction; varying a distance between two adjacent scan lines, which are used for fusing the powder layer, as a function of a length of at least one of the two adjacent scan lines.

The advantage of the various embodiments of the present invention is that any porosity and/or incomplete fusion in the fused material may be eliminated by setting the distance between adjacent scan lines to a predetermined distance range depending on the length of at least one of the adjacent scan lines. Since the length of a scan line may vary with the shape of the object to be fused and/or the scan direction with respect to the object, the distance between a first pair of adjacent scan lines may be different compared to a second pair of adjacent scan lines, where the first and second pair of adjacent scan lines are adjacent to each other. In a cross section of a three-dimensional object to be fused with a continuously varying shape, such as a triangle with equal length of its sides, the distance between adjacent scan lines may be different for each adjacent pair of scan lines along at least a portion of the triangle if the scan direction is parallel to one of its sides.

In an example embodiment of the present invention the distance is also a function of the sequence of the adjacent scan lines. A non-limiting advantage of at least this embodiment is that one may vary the separation distance between two adjacent scan lines depending on when in time they have been provided onto the powder layer for fusing the powder layer. This may have the advantage of speeding up the time it takes to reach an equilibrium fusion temperature.

In still another example embodiment of the present invention a first two adjacent scan lines are separated with a first distance and a second two adjacent scan lines, provided later than the first adjacent scan lines, are separated with a second distance, wherein the first distance is smaller than the second distance. A non-limiting advantage of at least this embodiment is that a first two adjacent scan lines are closer to each other than a second two adjacent scan lines if the first two adjacent scan lines are provided earlier than the second two adjacent scan lines. The first two adjacent scan lines may be provided at any place on a particular cross section of the three-dimensional article.

In an example embodiment of the present invention the distance between two adjacent scan lines is increasing for an increasing length of at least one of the adjacent scan lines. A non-limiting advantage of at least this embodiment is that for various dimensions for the three-dimensional article to be produced the distance between adjacent scan lines may be set to increase for increased dimensions, i.e., increased scan lengths.

In an example embodiment of the present invention the distance is determined as one of a group of: a function of the mean length of the two adjacent scan lines, a function of the longest of the two adjacent scan lines, or a function of the shortest of the two adjacent scan lines. A non-limiting advantage of at least this embodiment is that any one or a combination of the examples given above may be chosen for determining the distance between two adjacent scan lines. In an alternative embodiment the length of scan lines may be stored beforehand in a look-up table, where each length is corresponding to a specific distance between adjacent scan lines.

In another example embodiment the distance between adjacent scan lines is constant if one or both of the adjacent scan lines is longer than a predetermined value.

For scan lengths above a predetermined value the distance between adjacent scan lines may be kept constant without affecting the final material properties. However, for scan lengths shorter than the predetermined value the distance between adjacent scan lines needs to be varied as a function of the scan length in order to maintain the final material properties. The distance between adjacent scan lines may be decreased for decreased scan lengths, i.e., the shorter the mean scan length of two adjacent scan lines the smaller the distance between the adjacent scan lines. This may apply only for scan line lengths shorter than the predetermined value.

In still another example embodiment the distance between two adjacent scan lines is varied linearly as a function of the mean length of the two adjacent scan lines up to the predetermined value or as a function of the shortest scan line length of the two adjacent scan lines up to the predetermined value. Alternatively the distance may also be varied non-linearly as a function of the mean length or shortest scan line of the two adjacent scan lines. For instance a function according to $Y=A+BX+CX^2$ may be used, where A, B and C are constants, Y=distance between the adjacent scan lines, X=mean scan line length or shortest scan line length of the two adjacent scan lines.

In still another example embodiment the method further comprises the step of keeping a scan speed and/or an energy beam power and/or an energy beam spot size on the powder layer constant at least for the two adjacent scan lines. A non-limiting advantage of at least this embodiment is that only the distance between adjacent scan lines is varied when melting a particular region of a cross section for eliminating porosity in the final three-dimensional article. In an example embodiment the scan speed and/or energy beam power and/or energy beam spot size on the powder layer is constant for the full cross section of the three-dimensional article.

In still another example embodiment the method further comprising the step of keeping a time sink plus a first scan line time constant for each scan line in at least one cross section of the three-dimensional article. A non-limiting advantage of at least this embodiment is that the control and predictability of the material properties, such as tensile strength, ductility and/or microstructure may still further be improved. The time sink is the idling time where no fusing of the powder takes place or where fusing of the powder takes place elsewhere in relation to the first scan line.

In still another example embodiment of the present invention the energy beam is at least one of an electron beam or a laser beam.

At least one advantage of the various embodiments of the present invention is that it may be equally applicable to a laser based additive manufacturing process as an electron beam based additive manufacturing process.

In still another example embodiment the scan lines in at least one layer of at least one three-dimensional article may be straight lines. In still another example embodiment the scan lines in at least one layer of at least one three-dimensional region are meandering. The advantage of these embodiments of the present invention is that the inventive concept may be equally applicable irrespective of the type of scan lines used, i.e., they may be straight lines, meandering lines, saw-tooth shaped lines or any other shapes of the scan lines.

In yet another example embodiment of the present invention the adjacent scan lines in at least a first region may be fused with a first energy beam from a first energy beam source and a second energy beam from a second energy beam source. A non-limiting advantage of at least this embodiment is that the manufacturing speed may be increased my using multiple energy beam sources which may be set to provide scan lines on the powder surface having a distance between adjacent scan lines related to the length of at least one of the adjacent scan lines emanated either from the first or the second energy beam source.

In yet another example embodiment of the present invention the first energy beam is emanating from a first electron beam source and the second energy beam is emanating from a first laser beam source. In still another example embodiment the first energy beam is emanating from a first electron beam source and the second energy beam is emanating from a second electron beam source. In yet another example embodiment the first energy beam is emanating from a first laser beam source and the second energy beam is emanating from a second laser beam source.

A non-limiting advantage of at least these and still other embodiments is that different types of energy beam sources or equal types of energy beam source may be used to provide the scan lines on the powder surface. A laser beam may be used for regions with shorter scan lengths and an electron beam may be used for regions with longer scan lines for decreasing the manufacturing time and/or tailor the material properties.

In still another example embodiment the first and second energy beams are fusing the adjacent scan lines simultaneously. A non-limiting advantage of at least this embodiment is that manufacturing time may still be reduced. In an example embodiment two adjacent scan lines may be fused simultaneously with energy beam from two energy beam sources, where the energy beam sources may be of the same type or different types.

In still another example embodiment, a program element is provided that is configured and arranged to, when executed on a computer, implement a method forming at least one three-dimensional article through successive fusion of parts of a powder bed, which parts correspond to successive cross sections of the three-dimensional article. The method in this and other embodiments comprises at least the steps of: applying a first powder layer on a work table; directing a first energy beam from a first energy beam source over the work table so as to cause the first powder layer to fuse in first selected locations according to a corresponding model of the at least one three-dimensional article so as to form a first cross section of the three-dimensional article, where the first energy beam is configured to fuse at least a first region of a first cross section with two or more parallel scan lines in a first direction; and determining a distance between two adjacent of the two or more parallel scan lines, which are used for fusing the powder layer, as a function of a length of at least one of the two adjacent scan lines.

In still another embodiment, a non-transitory computer program product comprising at least one non-transitory computer-readable storage medium having computer-readable program code portions embodied therein is provided. The computer-readable program code portions therein comprise at least: an executable portion configured for directing application of a first powder layer on a work table; an executable portion configured for directing a first energy beam from a first energy beam source over the work table so as to cause the first powder layer to fuse in first selected locations according to a corresponding model of the at least one three-dimensional article so as to form a first cross section of the three-dimensional article, where the first energy beam is configured to fuse at least a first region of a first cross section with two or more parallel scan lines in a first direction; and an executable portion configured for determining a distance between two adjacent of the two or more parallel scan lines, which are used for fusing the powder layer, as a function of a length of at least one of the two adjacent scan lines.

In still another embodiment, an apparatus is provided for forming at least one three-dimensional article through successive fusion of parts of a powder bed, which parts correspond to successive cross sections of the three-dimensional article. In these and other embodiments, the apparatus comprises: a control unit having stored thereon a computer model of the at least one three-dimensional article; and at least one energy beam from at least one energy beam source, the at least one energy beam source being at least one of an electron beam or a laser beam. The at least one energy beam is configured to be directed, via the control unit, over a first powder layer applied on a work table so as to cause the first powder layer to fuse in first selected locations according to the computer model. In these and other embodiments, the at least one energy beam is configured to form a first cross section of the three-dimensional article. The further, the at least one energy beam is configured to fuse at least a first region of the first cross section with two or more parallel scan lines extending in a first direction. Additionally, the control unit is configured to determine a distance between two adjacent of the two or more parallel scan lines as a function of a length of at least one of the two adjacent scan lines.

In still another embodiment, a computer-implemented method for forming at least one three-dimensional article through successive fusion of parts of a powder bed, which parts correspond to successive cross sections of the three-dimensional article, is provided. The computer-implemented method comprises the steps of: receiving and storing, within one or more memory storage areas, a model of the at least one three-dimensional article; applying, based at least in part upon the model, a first powder layer on a work table; directing, via at least one computer processor, a first energy beam from a first energy beam source over the work table so as to cause the first powder layer to fuse in first selected locations according to the model and so as to form a first cross section of the three-dimensional article, where the first energy beam is configured to fuse at least a first region of a first cross section with two or more parallel scan lines in a first direction; and determining, via the at least one computer processor, a distance between two adjacent of the two or more parallel scan lines, which are used for fusing the powder layer, as a function of a length of at least one of the two adjacent scan lines.

BRIEF DESCRIPTION OF THE SEVERAL VIEWS OF THE DRAWINGS

Figure 1:
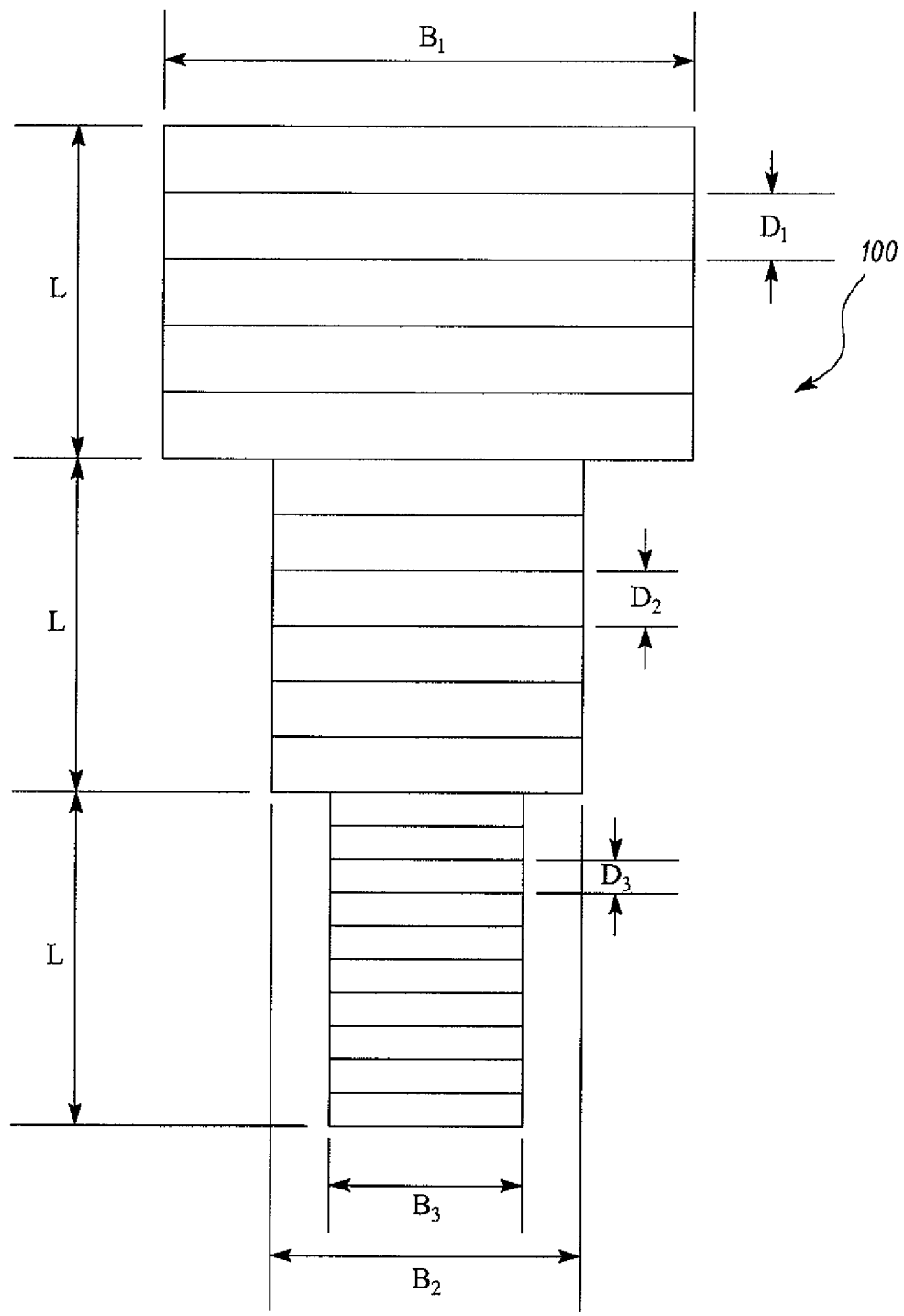
Figure 2:
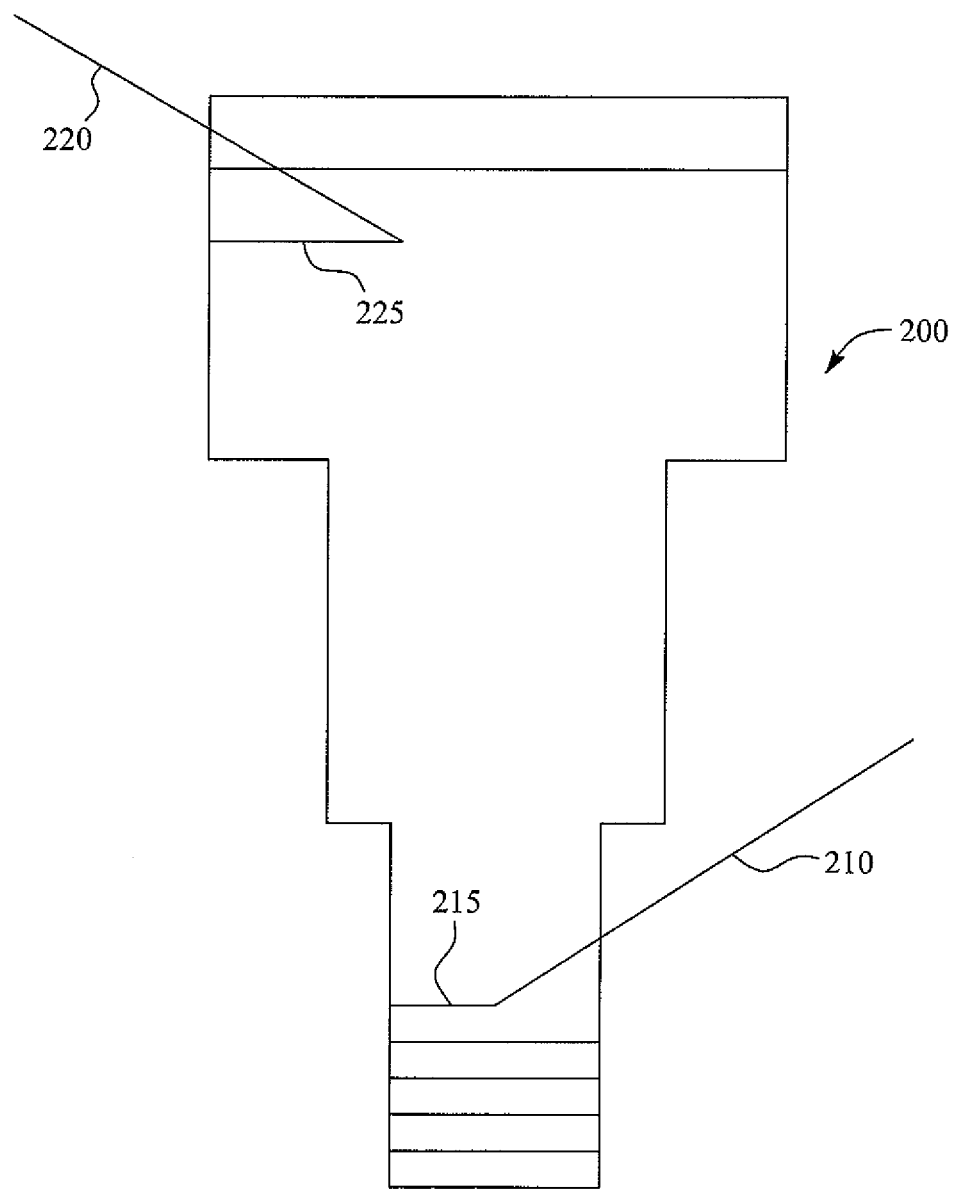
Figure 3:
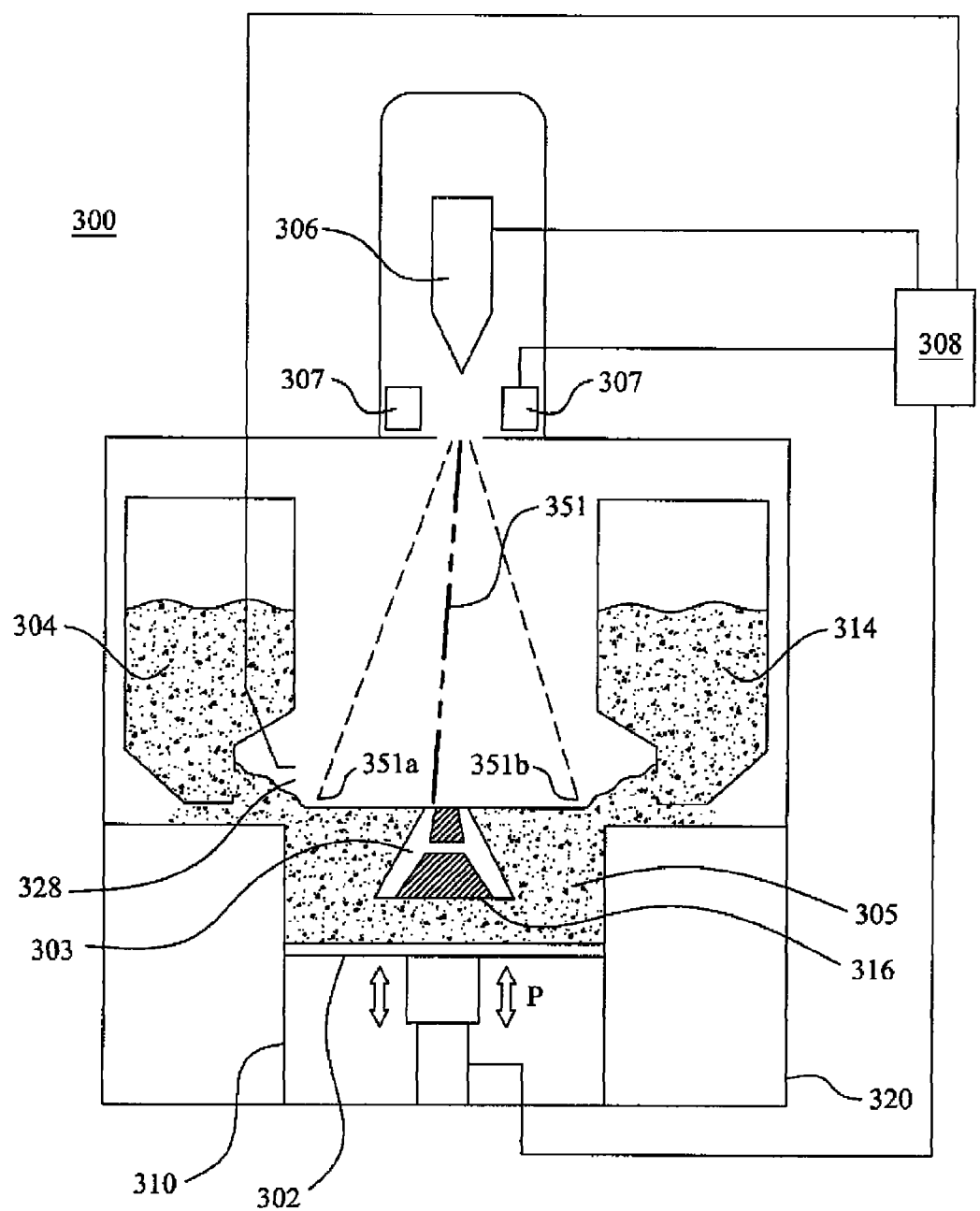
Figure 4:
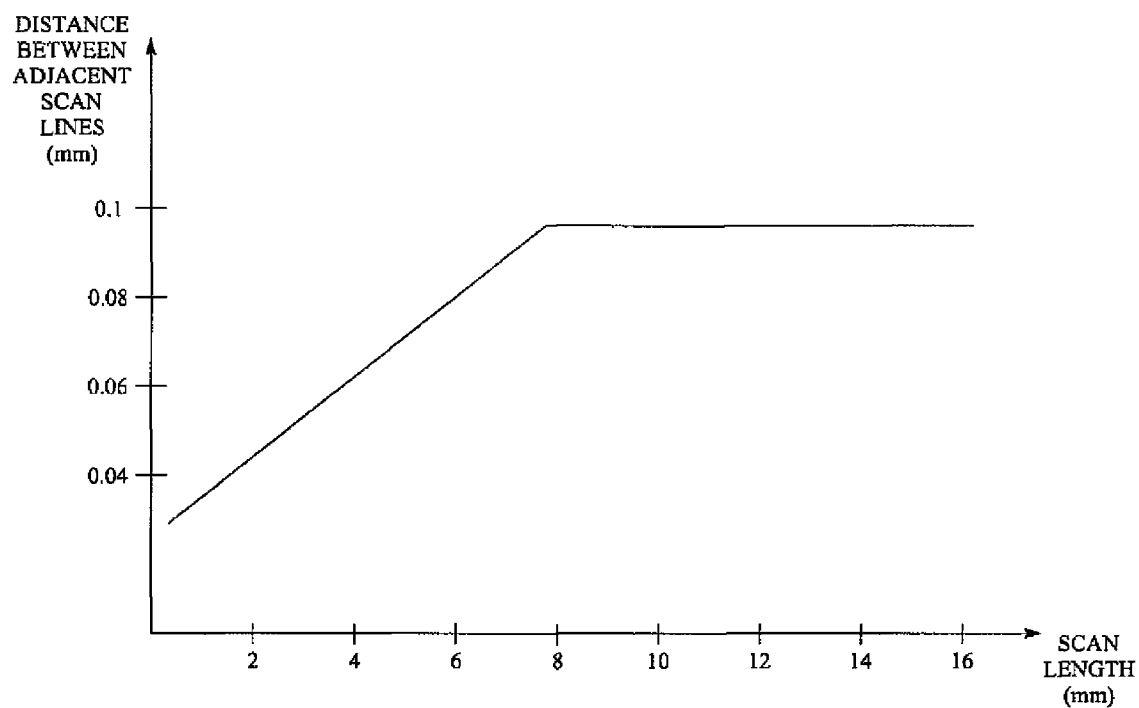
Figure 5:
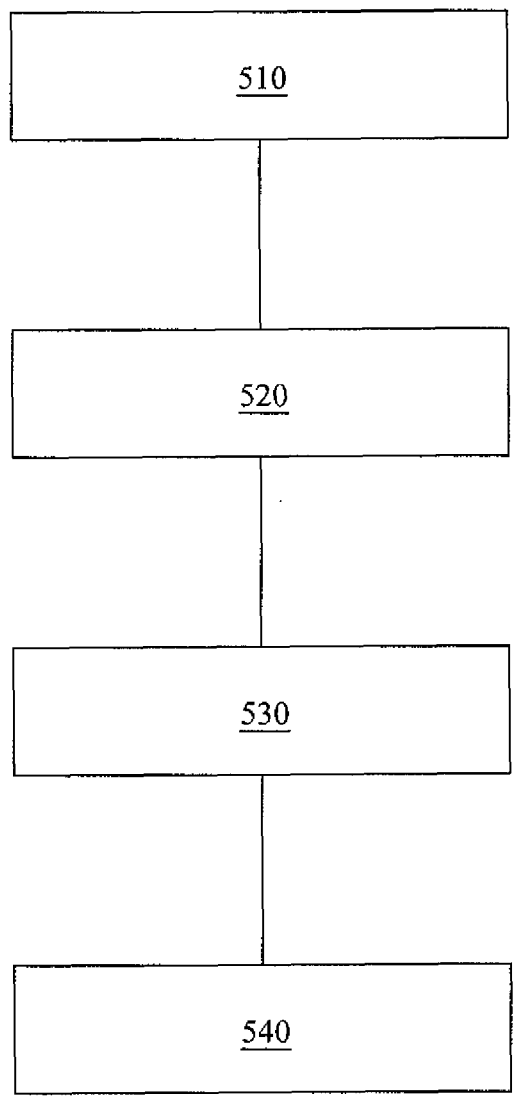
Figure 6:
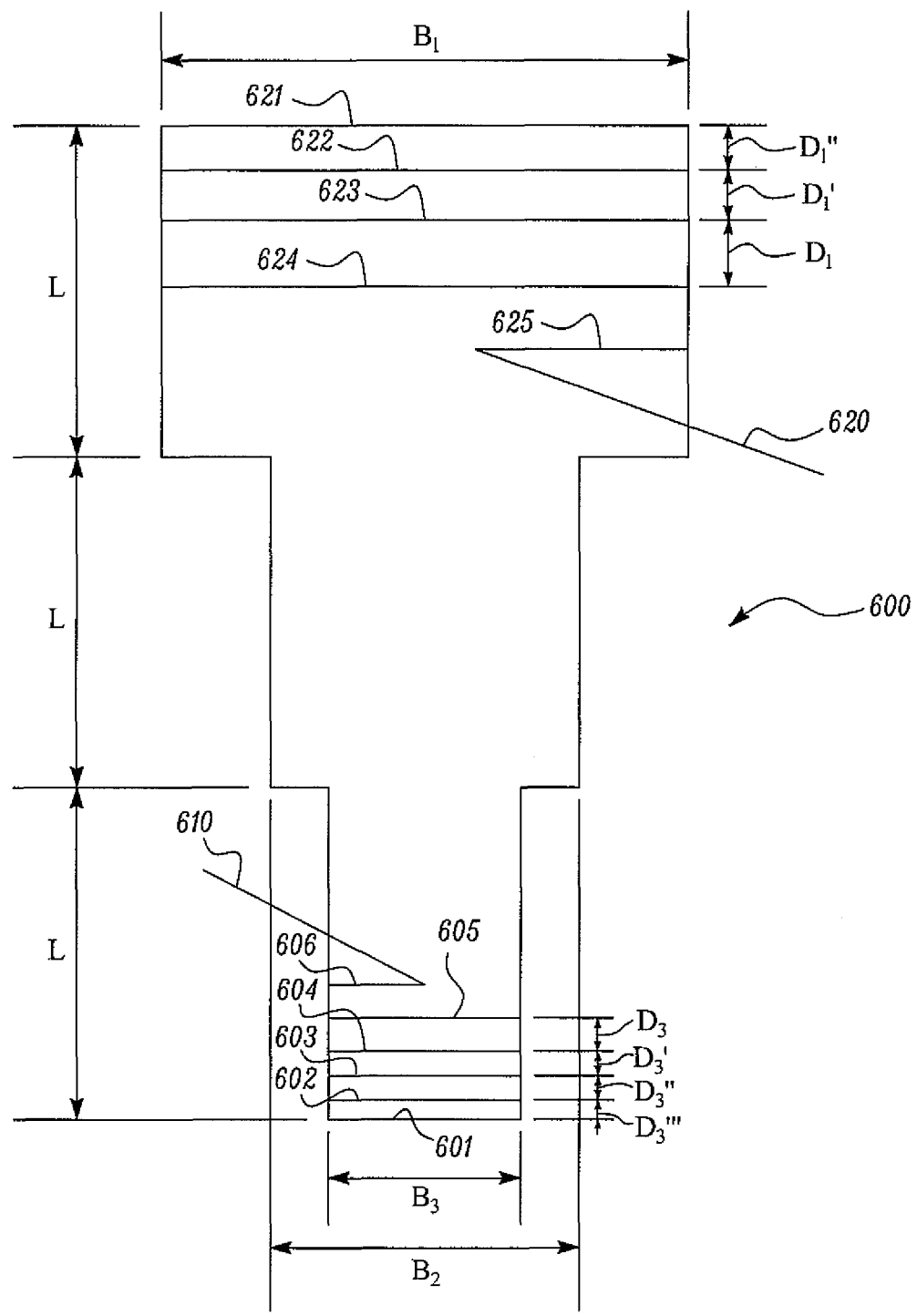
Figure 7:
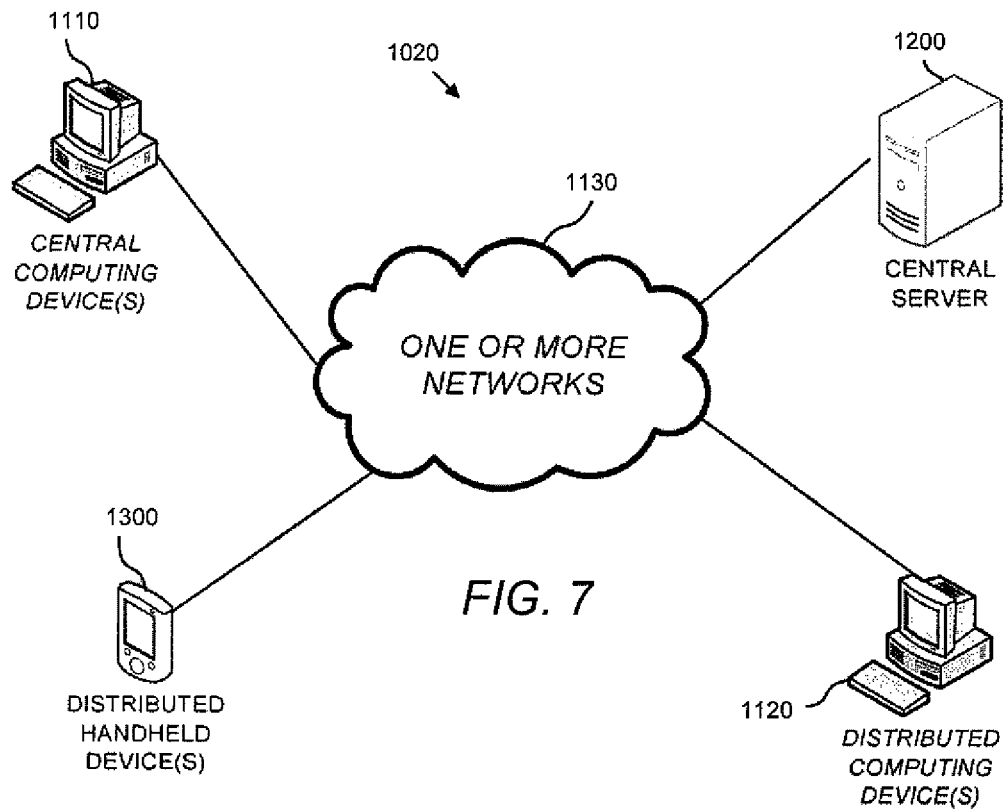
Figure 8A:
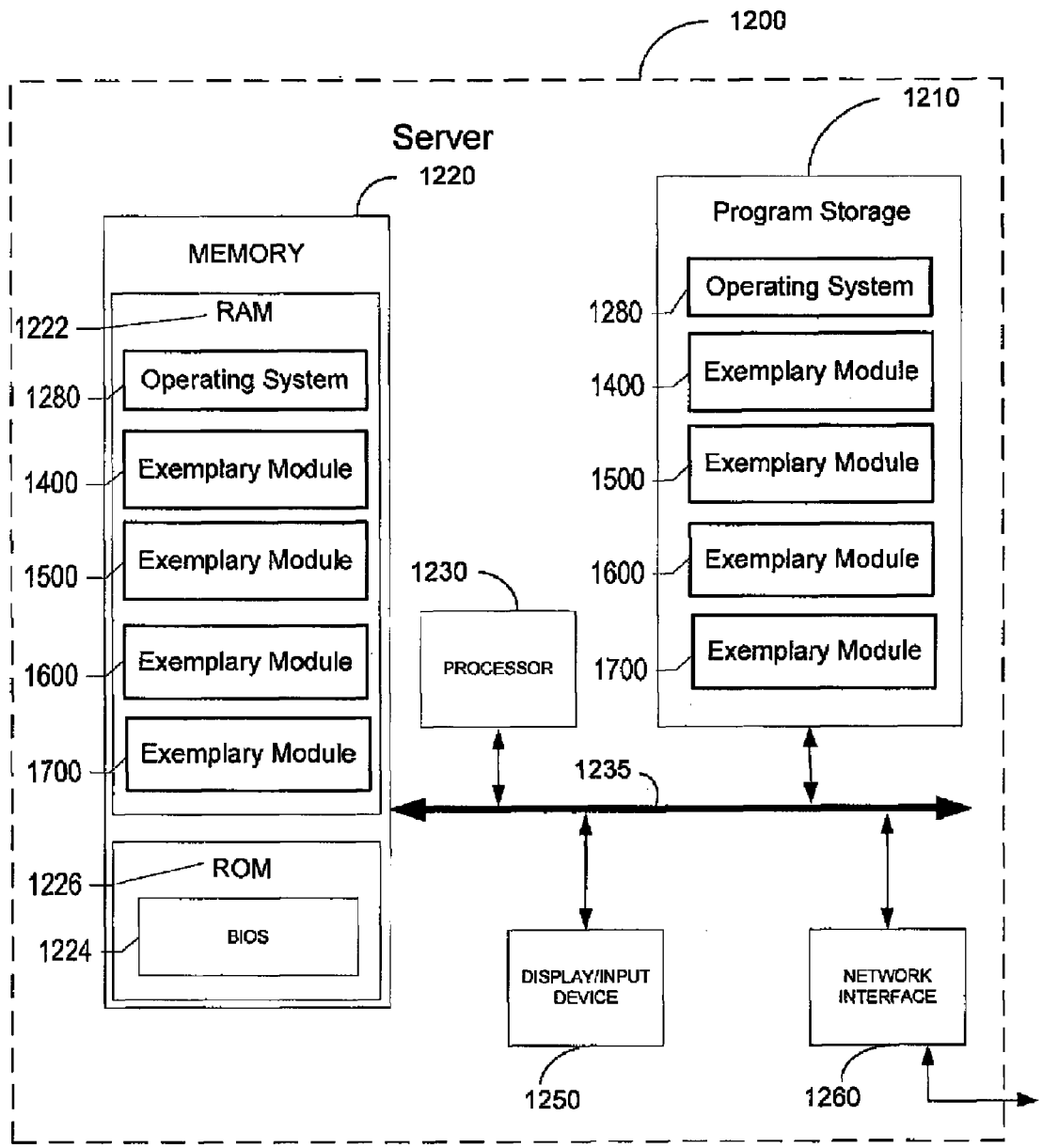
Figure 8B:
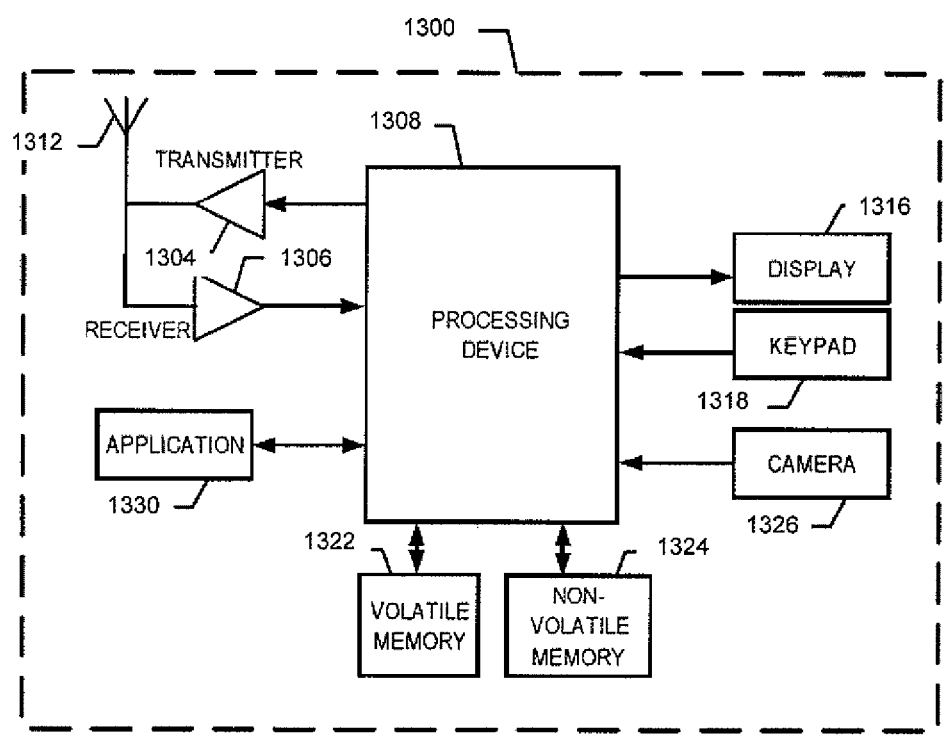

Having thus described the invention in general terms, reference will now be made to the accompanying drawings, which are not necessarily drawn to scale, and wherein:

FIG. 1 depicts a view from above of a three-dimensional article provided with a pattern of scan lines according to various embodiments of the present invention;

FIG. 2 illustrates schematically a view from above of an example embodiment of a melting strategy of a three-dimensional article using two energy beams according to various embodiments of the present invention, FIG. 3 depicts an apparatus in which various embodiments of the present invention may be implemented;

FIG. 4 depicts graph of a distance between adjacent scan lines as a function of scan length, FIG. 5 depicts a schematic flow chart of the inventive method;

FIG. 6 illustrates schematically a view from above of another example embodiment of a melting strategy of a three-dimensional article using two energy beams according to the present invention;

FIG. 7 is a block diagram of an exemplary system 1020 according to various embodiments;

FIG. 8A is a schematic block diagram of a server 1200 according to various embodiments; and FIG. 8B is a schematic block diagram of an exemplary mobile device 1300 according to various embodiments.

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Still further, to facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g., of structural material or materials) that are intended to be used for a particular purpose. Such structures, etc. may, for example, be designed with the aid of a three-dimensional CAD system.

The term "electron beam" as used herein in various embodiments refers to any charged particle beam. The sources of charged particle beam can include an electron gun, a linear accelerator and so on.

FIG. 3 depicts an example embodiment of a freeform fabrication or additive manufacturing apparatus 300 according to prior art in which various embodiments of the present invention may be implemented. The apparatus 300 comprises an electron beam source 306; two powder hoppers 304, 314; a start plate 316; a build tank 310; a powder distributor 328; a build platform 302; a vacuum chamber 320, a beam deflection unit 307 and a control unit 308. FIG.

3 discloses only one electron beam source for sake of simplicity. Of course, any number of electron beam sources may be used.

The vacuum chamber 320 is capable of maintaining a vacuum environment by means of or via a vacuum system, which system may comprise a turbomolecular pump, a scroll pump, an ion pump and one or more valves which are well known to a skilled person in the art and therefore need no further explanation in this context. The vacuum system may be controlled by the control unit 308. If using another beam source than an electron beam source, the build tank may be provided in an enclosable chamber provided with ambient air or a suitable gas atmosphere at or below atmosphere pressure. In still another example embodiment the build chamber may be provided in open air.

The electron beam source 306 is generating an electron beam, which may be used for melting or fusing together powder material 305 provided on the work table. The electron beam source 306 may be provided in the vacuum chamber 320. The control unit 308 may be used for controlling and managing the electron beam emitted from the electron beam source 306. The electron beam 351 may be deflected between at least a first extreme position 351a and at least a second extreme position 351b.

At least one focusing coil, at least one deflection coil and an electron beam power supply may be electrically connected to the control unit 308. The beam deflection unit 307 may comprise the at least one focusing coil, the at least one deflection coil and optionally at least one astigmatism coil. In an example embodiment of the invention the electron beam source may generate a focusable electron beam with an accelerating voltage of about 60 kV and with a beam power in the range of 0-3 kW. The pressure in the vacuum chamber may be in the range of $1 \times 10^{-3}$-$1 \times 10^{-6}$ mBar when building the three-dimensional article by fusing the powder layer by layer with the energy beam source 306.

Instead of melting the powder material with an electron beam, one or more laser beams and/or electron beams may be used. Each laser beam may normally be deflected by one or more movable mirror provided in the laser beam path between the laser beam source and the work table onto which the powder material is arranged which is to be fused by the laser beam. The control unit 308 may manage the deflection of the mirrors so as to steer the laser beam to a predetermined position on the work table.

The powder hoppers 304, 314 may comprise the powder material to be provided on the start plate 316 in the build tank 310. The powder material may for instance be pure metals or metal alloys such as titanium, titanium alloys, aluminum, aluminum alloys, stainless steel, Co—Cr—W alloy, etc. Instead of two powder hoppers, one powder hopper may be used. Other designs and/or mechanism for of the powder supply may be used, for instance a powder tank with a height-adjustable floor, i.e., providing powder from below instead of as in FIG. 3 where the powder is fed from above.

The powder distributor 328 may be arranged to lay down a thin layer of the powder material on the start plate 316. During a work cycle the build platform 302 will be lowered successively in relation to the energy beam source after having fused the layer of powder material. In order to make this movement possible, the build platform 302 is in one embodiment of the invention arranged movably in vertical direction, i.e., in the direction indicated by arrow P. This means that the build platform 302 may start in an initial position, in which a first powder material layer of necessary thickness has been laid down on the start plate 316. A first layer of powder material may be thicker than the other applied layers. The reason for starting with a first layer which is thicker than the other layers is that one may not want a melt-through of the first layer onto the start plate. The build platform may thereafter be lowered in connection with laying down a new powder material layer for the formation of a new cross section of a three-dimensional article. Means for lowering the build platform 302 may for instance be through a servo engine equipped with a gear, adjusting screws etc.

In FIG. 5 it is depicted a flow chart of an example embodiment of a method according to the present invention for forming at least one three-dimensional article through successive fusion of parts of a powder bed, which parts correspond to successive cross sections of the three-dimensional article. The method comprising a first step 510 of providing a model of the at least one three dimensional article. The model may be a computer model generated via a CAD (Computer Aided Design) tool. When building more than one three-dimensional article the articles may be equal or different to each other.

In a second step 520 a first powder layer is provided on a work table. The work table may be the start plate 316, the build platform 302, a powder bed or a partially fused powder bed. The powder may be distributed evenly over the work-table according to several methods. One way to distribute the powder is to collect material fallen down from the hopper 304, 314 by a rake system. The rake or powder distributor 328 may be moved over the build tank 310 and thereby distributing the powder over the work table.

A distance between a lower part of the rake and the upper part of the start plate or previous powder layer determines the thickness of powder distributed over the work table. The powder layer thickness can easily be adjusted by adjusting the height of the build platform 302.

In a third step 530 a first energy beam is directed from a first energy beam source over the work table causing the first powder layer to fuse in first selected locations according to corresponding models to form a first cross section of the at least one three-dimensional article 303.

The first energy beam may be fusing at least a first region of a first cross section with parallel scan lines in a first direction.

The first energy beam may be an electron beam or a laser beam. The beam is directed over the work table from instructions given by the control unit 308. In the control unit 308 instructions for how to control the beam source 306 for each layer of the three-dimensional article may be stored.

In a fourth step 540 a distance between two adjacent scan lines is determined, which are used for fusing the powder layer, as a function of a length of at least one of the two adjacent scan lines.

FIG. 1 depicts a view from above of a powder layer of a three-dimensional article 100. The powder layer has been provided with a pattern of scan lines according to an example embodiment of the present invention. The pattern of scan line may be determined during the manufacture of the three-dimensional article 100 or partly or completely before starting the manufacture of the three-dimensional article 100. The three-dimensional article 100 in FIG. 1 is tapered. A top section has a width $B_1$ and a length L, a middle section has a width $B_2$ and a length L and a bottom section has a width $B_3$ and a length L, where $B_1 > B_2 > B_3$. The direction of scan lines in this embodiment is chosen to be orthogonal to the length L of the sections of the three-dimensional article 100 for clarity reasons. However, the direction of scan lines may be at any angle in relation to the length L of the sections. In an example embodiment the direction of scan lines may be altered from one layer to another by a predetermined angle.

The scan lines in the top section have a length $B_1$. The distance between adjacent scan lines in the top section is $D_1$. The scan lines in the middle section have a length $B_2$. The distance between adjacent scan lines in the middle section is $D_2$. The scan lines in the bottom section have a length $B_3$. The distance between adjacent scan lines in the bottom section is $D_3$. According to various embodiments of the invention the a distance between two adjacent scan lines, which are used for fusing the powder layer, may be determined as a function of a length of at least one of the two adjacent scan lines, i.e., the distance $D_1$, $D_2$, $D_3$ between adjacent scan lines is related in some predetermined way to the corresponding length $B_1$, $B_2$, $B_3$ of at least one of the adjacent scan lines. In FIG. 1 $B_1 > B_2 > B_3$ and $D_1 > D_2 > D_3$, meaning that the distance between two adjacent scan lines $D_1$, $D_2$, $D_3$ is increasing for increasing length $B_1$, $B_2$, $B_3$ of at least one of the adjacent scan lines.

In an example embodiment the distance D1, D2, D3 may be determined as one of a group of: a function of the mean length of the two adjacent scan lines, a function of the longest of the two adjacent scan lines, or a function of the shortest of the two adjacent scan lines. In an example embodiment the function may be a linear function, $Y=A+Bx$, where Y is the distance between adjacent scan lines, X is the length of one of the adjacent scan lines and A and B are constants. In another example embodiment the function may be a polynomial function, $Y=A+Bx+CX2$, where Y is the distance between adjacent scan lines, X is the length of one of the adjacent scan lines and A, B and C are constants. Alternatively any other suitable function may be used such as an exponential function or logarithmic function etc.

FIG. 4 depicts an example embodiment of a diagram of the distance between adjacent scan lines as a function of at least one of the adjacent scan line lengths. From FIG. 4 one can see that for scan line lengths longer than 8 mm the distance between adjacent scan lines is constant. However, for scan line lengths shorter than 8 mm the distance between adjacent scan lines is shorter for shorter scan line lengths, i.e., the derivative of the slanted line between 0-8 mm scan line length is positive.

The scan length in FIG. 4 may be one of the adjacent scan line lengths (the shortest or the longest), the mean value of adjacent scan lines, the sum of adjacent scan lines, the product of the scan lines or any other mathematical function of one or both of the adjacent scan lines.

In an example embodiment the distance may start to become shorter for a second predetermined scan length. For instance in FIG. 4, the distance between adjacent scan lines may start to become shorter again if the scan length is longer than 20 mm.

In another example embodiment a scan speed and/or an energy beam power and/or an energy beam spot size on the powder layer may be kept constant for the two adjacent scan lines. This means that only one parameter may be changed during the fusion process of the powder layer. The parameter to be changed along a scan line may be the spot size or the beam power or the scan speed. In another example embodiment two parameters may be changed along a scan line, for instance the beam power and the spot size; the beam power and the scan speed; or the scan speed and the spot size.

In yet another example embodiment a time sink plus a scan line time may be kept constant for each scan line in at least one cross section of the three-dimensional article. This means that the total time of the time sink plus the scan line time for the scan lines in the top section takes equally long as the time sink plus the scan line time for the scan lines in the middle section. The scan line time plus the time sink for the scan lines in the middle section takes equally long as the time sink plus the scan line time for the scan lines in the bottom section. The advantage of keeping the scan line time plus a time sink constant for each scan line independently of the scan line length is that the material properties may be improved, such as the control of the microstructure in the three-dimensional article. The time sink is considered to be the time when the energy beam is not fusing a powder material at all or when the energy beam is fusing powder material at another position, i.e., a second scan line.

The energy beam may be a laser beam or an electron beam. The laser beam spot or electron beam spot may fuse the powder material in straight lines or meandering lines or any other suitable form of the scan lines such as saw tooth shaped.

In an example embodiment a first scan line of a first pair of adjacent scan lines in at least a first region is fused with a first energy beam from a first energy beam source and a second scan line of the first pair of adjacent scan lines in at least the first region is fused with a second energy beam from a second energy beam source.

In another example embodiment a first pair of adjacent scan lines in at least a first region are fused with a first energy beam from a first energy beam source and a second pair of adjacent scan lines in at least a second region are fused with an energy beam from a second energy beam source.

FIG. 2 illustrates schematically a view from above of a three-dimensional article 200 fused with a first energy beam 210 from a first energy beam source (not shown) and a second energy beam 220 from a second energy beam source (not shown). The three dimensional article 200 has the same dimension as the three-dimensional article 100 in FIG. 1, so the distance between scan lines in the different section (top, middle and bottom) may be the same. The first energy beam 210 is in FIG. 2 producing a scan line 215 in the bottom section of the three-dimensional article 200. The second energy beam 220 is in FIG. 2 producing a scan line 225 in the bottom section of the three-dimensional article 200. In FIG. 2 the scan line 225 which is to be finalized and the already finalized scan line above are fused with the second energy beam from the second energy beam source, i.e., two adjacent scan lines are emanating from the second energy beam source. In FIG. 2 the scan line 215 which is to be finalized and the already finalized scan lines below are fused with first energy beam from the first energy beam source, i.e., two adjacent scan lines are emanating from the first energy beam source.

Alternatively every second scan line may be applied on the three-dimensional article 200 from the first energy beam source and the other scan liens from the second energy beam source. The first end second energy beam sources may produce scan lines on the three-dimensional article simultaneously, i.e., they may produce scan lines adjacent to each other or scan lines separated with a sufficient distance in order to produce later on a scan line in between them. In still another example embodiment a single scan line may have a first end second portion. The first portion may be produced by the first energy beam and the second portion with the second beam. The first and second portions may be overlapping or stitched together without overlap.

The distance between adjacent scan lines in the top section in larger than the distance between adjacent scan lines in the bottom section. This has to do with, as has been explained before, that the scan line length in the top section is longer than the scan line length in the bottom section. For dimensions see the discussion in relation to the three-dimensional article 100 in FIG. 1 which is a cop of the three-dimensional article 200 in FIG. 2.

In an example embodiment the first energy beam source may be a laser source and the second energy beam source may be a electron beam source. In another example embodiment the first energy beam source may be a first laser source and the second energy beam source may be a second laser source. The first and second laser source may be identical. The first laser source may have a different maximum power output than the second laser source. The first end second laser source may differ in other parameters such as the way the laser is produced.

In still another example embodiment the first energy beam source may be a first electron beam source and the second energy beam source may be a second electron beam source. The first and second electron beam sources may be identical. The first electron beam source may have a different maximum power output than the second electron beam source. Sid first electron beam source may differ in other parameters such as the way the electron beam is generated, heated cathode or from a plasma.

If multiple three-dimensional articles are produced simultaneously the scan lines in a first article may be in a first direction and scan lines in a second article may be in a second direction. In FIGS. 1 and 2 the scan lines are illustrated to be in one and the same direction, i.e., horizontal. However, different directions of scan lines may be used for different articles and or layers of a specific article.

Two consecutive scan lines for a single article and single layer may be separated by a predetermined time interval. The more the scan speed is increased the more articles may be scanned within the predetermined time interval. An upper limit of the scan speed may be the power of the energy beam source. In order to melt a specific material a specific energy deposition into the material is required. When increasing the scan speed for a given energy beam spot size, the power of the energy beam is required to increase in order to deposit the same amount of energy into the material. At a certain scan speed a maximum power level of the energy beam source may be reached, i.e., the scan speed may not be increased any more without decreasing the energy deposit into the material.

In an example embodiment of the present invention the scan lines in at least one layer of at least a first three-dimensional article are fused with a first energy beam from a first energy beam source and at least one layer of at least a second three-dimensional article is fused with a second energy beam from a second energy beam source. More than one energy beam source may be used for fusing the scan lines. In another example embodiment a first energy beam source may be used for scanning directions within a first range of angles and a second energy beam source may be used for scanning directions within a second range of angles. The first end second ranges of angles may be overlapping or non-overlapping with each other. The first and second energy beam sources may be used in sequence or simultaneously.

By using more than one energy beam source the build temperature of the three-dimensional build may more easily be maintained compared to if just one beam source is used. The reason for this is that two beams may be at more locations simultaneously than just one beam. Increasing the number of beam sources will further ease the control of the build temperature. By using a plurality of energy beam sources a first energy beam source may be used for melting the powder material and a second energy beam source may be used for heating the powder material in order to keep the build temperature within a predetermined temperature range.

FIG. 6 illustrates schematically a view from above of a three-dimensional article 600 fused with a first energy beam 610 from a first energy beam source (not shown) and a second energy beam 620 from a second energy beam source (not shown). The three dimensional article 600 has the same dimension as the three-dimensional article 100, 200 in FIGS. 1 and 2 respectively.

The first energy beam 610 is in FIG. 6 providing a scan line 606 in the bottom section of the three-dimensional article 600 having a width $B_3$ and a length L. Already provided scan lines 601, 602, 603, 604, 605, in the bottom section are separated with different distances. A first two adjacent scan lines, made up by a first scan line 601 and a second scan line 602, are separated by a first distance $D_3'''$. A second two adjacent scan lines, made up by a second scan line 602 and a third scan line 603, are separated by a second distance $D_3''$. A third two adjacent scan lines, made up by a third scan line 603 and a fourth scan line 604, are separated by a third distance $D_3'$. A fourth two adjacent scan lines, made up by a fourth scan line 604 and a fifth scan line 605, are separated by a fourth distance $D_3$. In this example embodiment the first two adjacent scan lines are provided before the second two adjacent scan lines which in turn is provided before the third two adjacent scan lines which in turn is provided before the fourth two adjacent scan lines. The first distance $D_3'''$ is shorter than the second distance $D_3''$ which in turn is shorter than the third distance $D_3'$ which in turn is shorter than the fourth distance $D_3$.

The second energy beam 620 is in FIG. 6 producing a scan line 625 in the top section of the three-dimensional article 600 having a width $B_1$ and a length L. Already provided scan lines 621, 622, 623 and 624 in the top section are separated with different distances. A first two adjacent scan lines, made up by a first scan line 621 and a second scan line 622, are separated by a first distance $D_1''$. A second two adjacent scan lines, made up by a second scan line 622 and a third scan line 623, are separated by a second distance $D_1'$. A third two adjacent scan lines, made up by a third scan line 623 and a fourth scan line 624, are separated by a third distance $D_1$. In this example embodiment the first two adjacent scan lines are provided before the second two adjacent scan lines which in turn is provided before the third two adjacent scan lines. The first distance $D_1''$ is shorter than the second distance $D_1'$ which in turn is shorter than the third distance $D_1$.

Two adjacent scan lines which are provided later than the fourth two adjacent scan lines in the bottom section may be separated by the same distance as the fourth two adjacent scan lines, i.e., after a number of two adjacent scan lines have been provided in a particular section the separation distance between two adjacent scan lines may be constant. In the top section each two adjacent scan lines provided after the third two adjacent scan lines may be separated by the same distance.

By varying the separation distance between two adjacent scan lines one may further control the energy deposited into a cross section and thereby further decrease the manufacturing time and/or improve the material characteristics at the beginning of the fusion of a cross section. If using multiple energy beam sources, which may be of the same type or of different types, a first distance between two adjacent scan lines provided by a first energy beam from a first energy beam source at a first part of the cross section may be varied simultaneously as a first distance between two adjacent scan lines provided by a second energy beam from a second energy beam source at a second part of the cross section.

After a first layer is finished, i.e., the fusion of powder material for making a first layer of the three-dimensional article, a second powder layer is provided on the work table 316. The second powder layer is preferably, as a non-limiting example, distributed according to the same manner as the previous layer. However, there might be alternative methods in the same additive manufacturing machine for distributing powder onto the work table. For instance, a first layer may be provided by means of or via a first powder distributor, a second layer may be provided by another powder distributor. The design of the powder distributor is automatically changed according to instructions from the control unit. A powder distributor in the form of a single rake system, i.e., where one rake is catching powder fallen down from both a left powder hopper 306 and a right powder hopper 307, the rake as such can change design.

After having distributed the second powder layer on the work table 316, the energy beam from the energy beam source may be directed over the work table 316 causing the second powder layer to fuse in selected location(s) according to the model to form second cross sections of the three-dimensional article. Fused portions in the second layer may be bonded to fused portions of the first layer. The fused portions in the first and second layer may be melted together by melting not only the powder in the uppermost layer but also remelting at least a fraction of a thickness of a layer directly below the uppermost layer.

In another aspect of the invention it is provided a program element configured and arranged when executed on a computer to implement a method for forming at least one three-dimensional article through successive fusion of parts of a powder bed, which parts correspond to successive cross sections of the three-dimensional article, the method comprising the steps of: providing a model of the at least one three-dimensional article; applying a first powder layer on a work table; directing a first energy beam from a first energy beam source over the work table so as to cause the first powder layer to fuse in first selected locations according to corresponding models so as to form a first cross section of the three-dimensional article, where the first energy beam is configured to fuse at least a first region of a first cross section with two or more parallel scan lines in a first direction; and determining a distance between two adjacent of the two or more parallel scan lines, which are used for fusing the powder layer, as a function of a length of at least one of the two adjacent scan lines. The program element may be installed in a computer readable storage medium. The computer readable storage medium may be any control unit as described elsewhere herein or another separate and distinct control unit. The computer readable storage medium and the program element, which may comprise computer-readable program code portions embodied therein, may further be contained within a non-transitory computer program product. Further details regarding these features and configurations are provided, in turn, below.

As mentioned, various embodiments of the present invention may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like, as have been described elsewhere herein. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

FIG. 7 is a block diagram of an exemplary system 1020 that can be used in conjunction with various embodiments of the present invention. In at least the illustrated embodiment, the system 1020 may include one or more central computing devices 1110, one or more distributed computing devices 1120, and one or more distributed handheld or mobile devices 1300, all configured in communication with a central server 1200 (or control unit) via one or more networks 1130. While FIG. 7 illustrates the various system entities as separate, standalone entities, the various embodiments are not limited to this particular architecture.

According to various embodiments of the present invention, the one or more networks 1130 may be capable of supporting communication in accordance with any one or more of a number of second-generation (2G), 2.5G, third-generation (3G), and/or fourth-generation (4G) mobile communication protocols, or the like. More particularly, the one or more networks 1130 may be capable of supporting communication in accordance with 2G wireless communication protocols IS-136 (TDMA), GSM, and IS-95 (CDMA). Also, for example, the one or more networks 1130 may be capable of supporting communication in accordance with 2.5G wireless communication protocols GPRS, Enhanced Data GSM Environment (EDGE), or the like. In addition, for example, the one or more networks 1130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 1020 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the device(s) 1110-1300 are illustrated in FIG. 7 as communicating with one another over the same network 1130, these devices may likewise communicate over multiple, separate networks.

According to one embodiment, in addition to receiving data from the server 1200, the distributed devices 1110, 1120, and/or 1300 may be further configured to collect and transmit data on their own. In various embodiments, the devices 1110, 1120, and/or 1300 may be capable of receiving data via one or more input units or devices, such as a keypad, touchpad, barcode scanner, radio frequency identification (RFID) reader, interface card (e.g., modem, etc.) or receiver. The devices 1110, 1120, and/or 1300 may further be capable of storing data to one or more volatile or non-volatile memory modules, and outputting the data via one or more output units or devices, for example, by displaying data to the user operating the device, or by transmitting data, for example over the one or more networks 1130.

In various embodiments, the server 1200 includes various systems for performing one or more functions in accordance with various embodiments of the present invention, including those more particularly shown and described herein. It should be understood, however, that the server 1200 might include a variety of alternative devices for performing one or more like functions, without departing from the spirit and scope of the present invention. For example, at least a portion of the server 1200, in certain embodiments, may be located on the distributed device(s) 1110, 1120, and/or the handheld or mobile device(s) 1300, as may be desirable for particular applications. As will be described in further detail below, in at least one embodiment, the handheld or mobile device(s) 1300 may contain one or more mobile applications 1330 which may be configured so as to provide a user interface for communication with the server 1200, all as will be likewise described in further detail below.

FIG. 8A is a schematic diagram of the server 1200 according to various embodiments. The server 1200 includes a processor 1230 that communicates with other elements within the server via a system interface or bus 1235. Also included in the server 1200 is a display/input device 1250 for receiving and displaying data. This display/input device 1250 may be, for example, a keyboard or pointing device that is used in combination with a monitor. The server 1200 further includes memory 1220, which preferably includes both read only memory (ROM) 1226 and random access memory (RAM) 1222. The server's ROM 1226 is used to store a basic input/output system 1224 (BIOS), containing the basic routines that help to transfer information between elements within the server 1200. Various ROM and RAM configurations have been previously described herein.

In addition, the server 1200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 1210 are connected to the system bus 1235 by an appropriate interface. The storage devices 1210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 1210 and/or memory of the server 1200 may further provide the functions of a data storage device, which may store historical and/or current delivery data and delivery conditions that may be accessed by the server 1200. In this regard, the storage device 1210 may comprise one or more databases. The term "database" refers to a structured collection of records or data that is stored in a computer system, such as via a relational database, hierarchical database, or network database and as such, should not be construed in a limiting fashion.

A number of program modules (e.g., exemplary modules 1400-1700) comprising, for example, one or more computer-readable program code portions executable by the processor 1230, may be stored by the various storage devices 1210 and within RAM 1222. Such program modules may also include an operating system 1280. In these and other embodiments, the various modules 1400, 1500, 1600, 1700 control certain aspects of the operation of the server 1200 with the assistance of the processor 1230 and operating system 1280. In still other embodiments, it should be understood that one or more additional and/or alternative modules may also be provided, without departing from the scope and nature of the present invention.

In various embodiments, the program modules 1400, 1500, 1600, 1700 are executed by the server 1200 and are configured to generate one or more graphical user interfaces, reports, instructions, and/or notifications/alerts, all accessible and/or transmittable to various users of the system 1020. In certain embodiments, the user interfaces, reports, instructions, and/or notifications/alerts may be accessible via one or more networks 1130, which may include the Internet or other feasible communications network, as previously discussed.

In various embodiments, it should also be understood that one or more of the modules 1400, 1500, 1600, 1700 may be alternatively and/or additionally (e.g., in duplicate) stored locally on one or more of the devices 1110, 1120, and/or 1300 and may be executed by one or more processors of the same. According to various embodiments, the modules 1400, 1500, 1600, 1700 may send data to, receive data from, and utilize data contained in one or more databases, which may be comprised of one or more separate, linked and/or networked databases.

Also located within the server 1200 is a network interface 1260 for interfacing and communicating with other elements of the one or more networks 1130. It will be appreciated by one of ordinary skill in the art that one or more of the server 1200 components may be located geographically remotely from other server components. Furthermore, one or more of the server 1200 components may be combined, and/or additional components performing functions described herein may also be included in the server.

While the foregoing describes a single processor 1230, as one of ordinary skill in the art will recognize, the server 1200 may comprise multiple processors operating in conjunction with one another to perform the functionality described herein. In addition to the memory 1220, the processor 1230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the "server" 1200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 1200 may likewise be used without departing from the spirit and scope of embodiments of the present invention.

According to various embodiments, many individual steps of a process may or may not be carried out utilizing the computer systems and/or servers described herein, and the degree of computer implementation may vary, as may be desirable and/or beneficial for one or more particular applications.

FIG. 8B provides an illustrative schematic representative of a mobile device 1300 that can be used in conjunction with various embodiments of the present invention. Mobile devices 1300 can be operated by various parties. As shown in FIG. 8B, a mobile device 1300 may include an antenna 1312, a transmitter 1304 (e.g., radio), a receiver 1306 (e.g., radio), and a processing element 1308 that provides signals to and receives signals from the transmitter 1304 and receiver 1306, respectively.

The signals provided to and received from the transmitter 1304 and the receiver 1306, respectively, may include signaling data in accordance with an air interface standard of applicable wireless systems to communicate with various entities, such as the server 1200, the distributed devices 1110, 1120, and/or the like. In this regard, the mobile device 1300 may be capable of operating with one or more air interface standards, communication protocols, modulation types, and access types. More particularly, the mobile device 1300 may operate in accordance with any of a number of wireless communication standards and protocols. In a particular embodiment, the mobile device 1300 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 1300 may according to various embodiments communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The mobile device 1300 can also download changes, add-ons, and updates, for instance, to its firmware, software (e.g., including executable instructions, applications, program modules), and operating system.

According to one embodiment, the mobile device 1300 may include a location determining device and/or functionality. For example, the mobile device 1300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 1300 may also comprise a user interface (that can include a display 1316 coupled to a processing element 1308) and/or a user input interface (coupled to a processing element 308). The user input interface can comprise any of a number of devices allowing the mobile device 1300 to receive data, such as a keypad 1318 (hard or soft), a touch display, voice or motion interfaces, or other input device. In embodiments including a keypad 1318, the keypad can include (or cause display of) the conventional numeric (0-9) and related keys (#, *), and other keys used for operating the mobile device 1300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 1300 can also include volatile storage or memory 1322 and/or non-volatile storage or memory 1324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 1300.

The mobile device 1300 may also include one or more of a camera 1326 and a mobile application 1330. The camera 1326 may be configured according to various embodiments as an additional and/or alternative data collection feature, whereby one or more items may be read, stored, and/or transmitted by the mobile device 1300 via the camera. The mobile application 1330 may further provide a feature via which various tasks may be performed with the mobile device 1300. Various configurations may be provided, as may be desirable for one or more users of the mobile device 1300 and the system 1020 as a whole.

The invention is not limited to the above-described embodiments and many modifications are possible within the scope of the following claims. Such modifications may, for example, involve using a different source of energy beam than the exemplified electron beam such as a laser beam. Other materials than metallic powder may be used, such as the non-limiting examples of: electrically conductive polymers and powder of electrically conductive ceramics.

That which is claimed:

1. A method for forming at least one three-dimensional article without introducing either porosities or incomplete fusion therein through successive fusion of parts of a powder bed, which parts correspond to successive cross sections of the three-dimensional article, said method comprising the steps of:
    applying a first powder layer on a work table;
    determining, via at least one computer processor of a control unit, a length of at least one of two adjacent of two or more parallel scan lines either applied to the first powder layer or to be applied to the first powder layer;
    setting, via the at least one computer processor of the control unit, a distance between the two adjacent of two or more parallel scan lines as a function of the determined length, wherein the function of the determined length is such that as the determined length increases:
        (a) the distance increases while the determined length is less than a predetermined value, and (b) the distance is a constant value while the determined length is equal to or greater than the predetermined value; and
    directing, via the at least one computer processor of the control unit, a first energy beam from a first energy beam source over said work table so as to cause said first powder layer to fuse in first selected locations according to a corresponding model of said at least one three-dimensional article so as to form a first cross section of said three-dimensional article, where said first energy beam is configured to fuse at least a first region of a first cross section either with said two adjacent of said two or more parallel scan lines extending in a first direction and separated by said set distance, or with at least one additional parallel scan line extending in said first direction and separated from said two adjacent of said two or more parallel scan lines by said set distance.

2. The method according to claim 1, wherein said distance is also a function of the sequence of said adjacent scan lines.

3. The method according to claim 2, wherein:
    a first set of two adjacent scan lines are separated with a first distance;
    a second set of two adjacent scan lines, provided later than said first set of adjacent scan lines, are separated with a second distance; and
    said first distance is smaller than said second distance.

4. The method according to claim 1, wherein said distance is determined based upon at least one of: a function of the mean length of said two adjacent scan lines, a function of the longest of said two adjacent scan lines, or a function of the shortest of said two adjacent scan lines.

5. The method according to claim 1, further comprising the step of keeping at least one of a scan speed, an energy beam power, or an energy beam spot size on said powder layer constant for said two adjacent scan lines.

6. The method according to claim 1, further comprising the step of keeping a time sink and a scan line time constant for each scan line in at least one cross section of said three-dimensional article.

7. The method according to claim 1, wherein said distance between two adjacent scan lines varies at least one of: linearly as a function of a mean length of said two adjacent scan lines up to said predetermined value, or as a function of the shortest scan line of said two adjacent scan lines up to said predetermined value.

8. The method according to claim 1, wherein said energy beam is at least one of an electron beam or a laser beam.

9. The method according to claim 1, wherein the scan lines in at least one layer of at least one three-dimensional article are straight lines.

10. The method according to claim 1, wherein the scan lines in at least one layer of at least one three-dimensional region are meandering lines.

11. The method according to claim 1, wherein the adjacent scan lines in at least a first region are fused with a first energy beam from a first energy beam source and a second energy beam from a second energy beam source.

12. The method according to claim 11, wherein:
said first energy beam is emanating from a first electron beam source; and
said second energy beam is emanating from a first laser beam source.

13. The method according to claim 11, wherein:
said first energy beam is emanating from a first electron beam source; and
said second energy beam is emanating from a second electron beam source.

14. The method according to claim 11, wherein:
said first energy beam is emanating from a first laser beam source; and
said second energy beam is emanating from a second laser beam source.

15. The method according to claim 11, wherein said first and second energy beams are configured to fuse said adjacent scan lines simultaneously.

16. The method according to claim 1, wherein said distance between two adjacent scan lines varies linearly as a function of a mean length of said two adjacent scan lines up to said predetermined value.

17. The method according to claim 1, wherein said distance between two adjacent scan lines varies linearly as a function of the shortest scan line of said two adjacent scan lines up to said predetermined value.

* * * * *